(12) United States Patent
Johnson

(10) Patent No.: US 6,246,405 B1
(45) Date of Patent: *Jun. 12, 2001

(54) METHOD AND APPARATUS FOR MANAGING A PLURALITY OF OBJECTS ON A GRAPHICAL USER INTERFACE

(75) Inventor: William J. Johnson, Flower Mound, TX (US)

(73) Assignee: MCI Communications Corporation, Washington, DC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/870,510

(22) Filed: Jun. 6, 1997

(51) Int. Cl.[7] .................................................. G06F 9/00
(52) U.S. Cl. ............................ 345/339; 345/346; 345/335
(58) Field of Search .................................. 345/335, 349, 345/329, 339, 337, 347, 333, 346, 348, 352

(56) References Cited

U.S. PATENT DOCUMENTS

| | | | |
|---|---|---|---|
| 5,050,105 | * | 9/1991 | Peters ..................................... 345/346 |
| 5,396,591 | * | 3/1995 | Goss ....................................... 345/347 |
| 5,625,781 | * | 4/1997 | Cline et al. ............................ 345/335 |
| 5,790,120 | * | 8/1998 | Lozares et al. ....................... 345/349 |
| 5,897,635 | * | 4/1999 | Torres et al. ............................ 707/10 |

* cited by examiner

Primary Examiner—Raymond J. Bayerl
Assistant Examiner—Cao H. Nguyen

(57) ABSTRACT

A system and method for managing a plurality of objects on a GUI to perform common and routine tasks. A windowed application program is provided that allows the user to define an object chain containing handles to application objects appearing on the user's GUI. Each object chain is associated with a particular keystroke sequence which is selected by the user when defining the corresponding object chain. The user may toggle through many applications, and associated objects, by depressing the corresponding hot-key. A pointer in a chain table keeps track of the next application in the chain. The chain table can be temporary or permanent.

9 Claims, 5 Drawing Sheets

METHOD AND APPARATUS FOR MANAGING A PLURALITY OF OBJECTS ON A GRAPHICAL USER INTERFACE

TECHNICAL FIELD OF THE INVENTION present invention relates in general to a system and method for managing objects on a computer display and in particular to an application program and method for building a chain of objects that allows a user to work with multiple applications for performing common and routine tasks.

BACKGROUND OF THE INVENTION

Without limiting the scope of the invention, its background is described in connection with windowed operating systems such as the Microsoft Windows or IBM OS/2. It should be understood that the principles disclosed may be implemented in any computing environment where access to multiple applications is provided using a single user interface.

Graphical User Interfaces ("GUIs") have replaced command line and other primitive interfaces as a way of performing most common tasks on many of today's computing platforms. The computing platforms may vary but most offer common features such as a display, disk drive, memory and processing means, keyboard and other standard device components. Examples include workstations, desktop and notebook computers, dedicated terminals, file servers and other similar computing systems.

With most modern GUIs, application tasks and system controls are made accessible to the user via objects on the GUI display. The display can be a terminal such as a liquid crystal display, cathode ray tube or other similar display means. The objects may appear as icons, windows, items in a list or other graphical representation symbolically linked to an underlying program, task or function. To invoke the application, task or function, a user can focus on the object with a mouse or keyboard to select the object resulting in the execution of the underlying application, task or function. An application may contain many objects of its user interface.

Often, a user desires to have many applications open at a single time on the desktop workspace. This allows for quick navigation through several applications as well as more efficient transfer of information between applications. As the number of active applications increases, however, the ease with which a user moves from one application to the next is reduced. Excess navigation is required for overlapped windows and finding windows which are overlapped.

Over time a particular user may find himself performing common or tedious tasks using the same set of core applications. For example, the user may employ a spreadsheet program, database program and wordprocessor to create a weekly or monthly report. For each program, the user may size, resize, minimize, maximize, drag, focus, move or otherwise manipulate the program objects on the GUI. This process of overlapping windows and repositioning them is a common task performed by users who are making room for working with other objects on the GUI. Sometimes, users wish to transfer files and information from two or more applications into a single application.

Still other tasks, operations and functions may be performed by a user often on a nonperiodic basis. In performing these common tasks and functions, a user spends a significant amount of time navigating through the GUI and manipulating the objects for the sole purpose of finding applications which are being used at the same time as other applications.

A prior art method of navigating and arranging the various application objects involves the use of a keystroke sequence which toggles through the active application objects on the desktop GUI. For example, in a windowed environment, a user may depress the "Alt-Tab" keystroke sequence as a toggle through active application objects. Each time the user depresses the keystroke sequence an application is focused on and brought to the forefront of the desktop window permitting the user to view, copy, print, save, delete, cut, paste, select, scroll, size or otherwise manipulate the information in that window.

Once the user is finished with one application object, he or she depresses the keystroke sequence to focus on the next application object. The next application object may be useful to the user or the user may need to navigate to the next active application object in order to accomplish a given task. Since the sequence is not tied to a particular group or order of applications, applications (objects thereof) are focused on in the order in which they have been activated on the desktop. This process, therefore, consumes time in navigating through the desired applications objects in order to achieve a desired task or function.

Accordingly, a system and method that conveniently manages objects on the desktop GUI, particularly when working with a plurality of active applications, would save time and provide numerous advantages over the prior art.

SUMMARY OF THE INVENTION

A principle object of the present invention is to provide a system for efficiently managing a plurality of objects on a task driven basis. In this regard, the system employs a program which allows a user to build a chain of objects. The invention has practical application in situations where the user desires to navigate through a plurality of tasks or applications. A user selected keystroke sequence is identified by the user and connected to a particular chain. In this way, common tasks or functions can be linked to a keystroke sequence which roundrobins through a user defined chain of application objects.

Another advantage of the present invention is to provide a system that allows a user to sequence through applications, and objects thereof, quickly and conveniently. In this regard, the present invention has practical applications in that it improves the interoperativity of many applications using a chain table to organize multiple chains of applications. The chain table contains fields that store a plurality of chain invocation commands along with handles to objects in the chain. The chain table may contain temporary or permanent object handles depending on various embodiments. Thus the present invention eliminates the time spent by the user in navigating through applications.

Still another advantage of the present invention is to provide a system wherein the user can easily reorder, remove, add or delete objects within a given chain. In this regard, the interface allows the user to maintain objects with the chain table with a simple point and shoot sequence. The user can easily transpose commands or jump a given number of positions to any object in the chain. This feature allows the user to keep a larger than needed object chain while eliminating round-robin affects through objects which are not of interest at a particular moment or useful in performing a particular task.

Disclosed according to one embodiment is a system and method of managing a plurality of objects on a GUI to perform common and routine tasks. The user can define an object chain containing a plurality of index handles to active application objects on the GUI. Each object chain is associated with a particular hot-key sequence which is selected by the user when defining an object chain table. The user sequences among the various applications in an object chain by depressing the corresponding hot-key. A object pointer keeps track of the next application in the chain. If an object in the chain is minimized, the underlying application is focused to the last dimensions and position it consumed when last recalled. If an object is a window already present, the application is brought to the forefront of the GUI. If an object is a full screen application, such as a full DOS application, the full screen session is brought to the foreground. Thus, the user can focus any of the objects with a simple hot-key command.

For a more complete understanding of the present invention, including its features and advantages, reference is now made to the following detailed description taken in conjunction with the accompanying drawings.

BRIEF DESCRIPTION OF THE DRAWINGS

In the drawings.

Corresponding numerals and symbols in the different figures refer to corresponding parts unless otherwise indicated.

DETAILED DESCRIPTION OF THE PREFERRED EMBODIMENT

Figure 1:
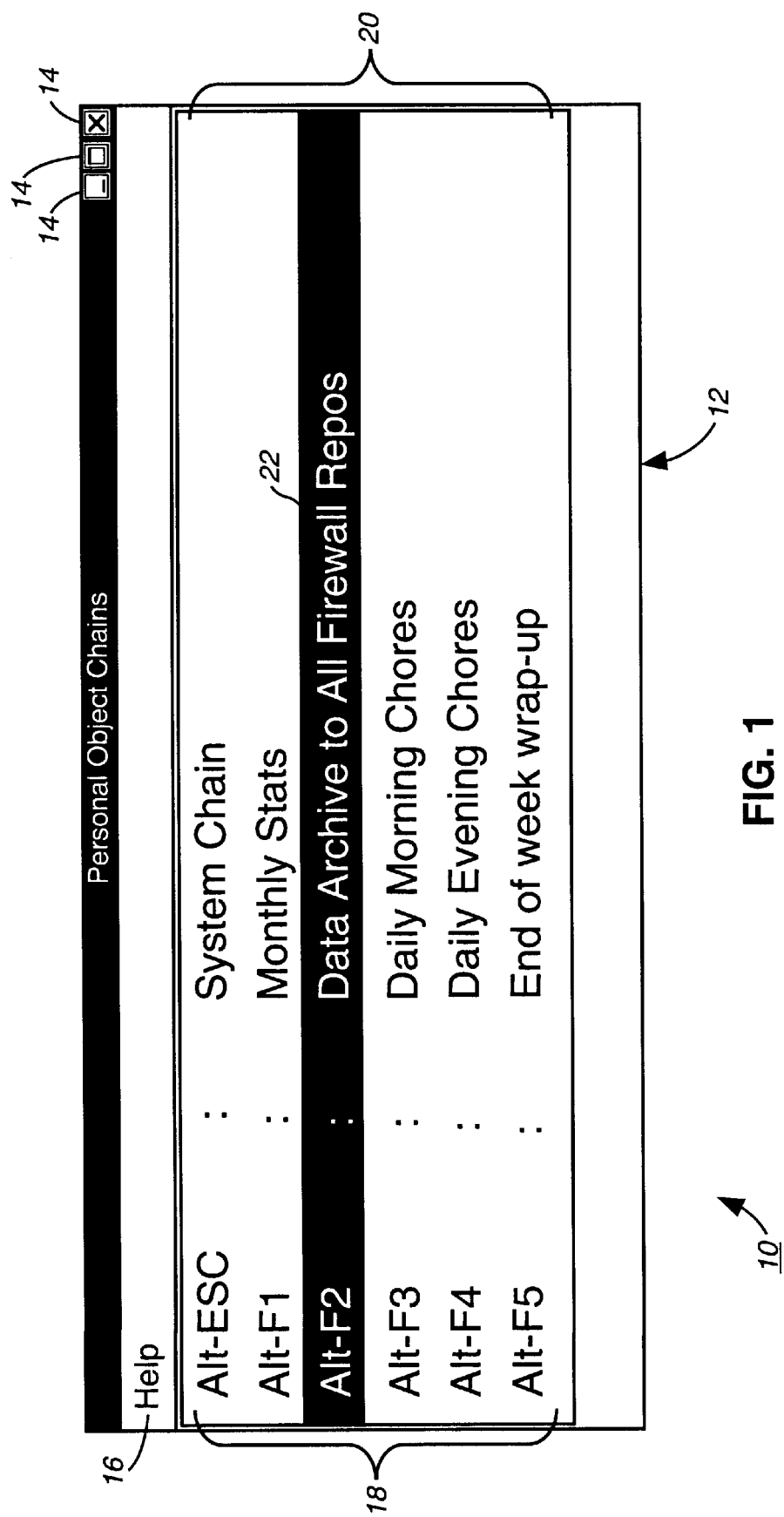
FIG. 1 shows a chain query window 10 according to one embodiment of the invention.

Referring now to FIG. 1, the main object chain query window is shown and denoted generally as 10. Chain query window 10 could be invoked by the user by clicking on an icon or other object on the computer GUI, or as a result of a command line program. The icon object may be installed by the user as a utility on his computer with a setup file. According to one embodiment, the chain query window 10 appears automatically upon power-up of the user's computer system. The computer system can be a workstation, desktop or notebook computer, dedicated terminal, file server or other similar computing platform.

When chain query window 10 is invoked, processing accesses a chain table discussed below for all data to display. The chain table is accessed from Terminate Stay Resident ("TSR") memory, therefore the TSR must be loaded in the system prior to performing a query. Step 86 of FIG. 3 must have completed before the chain query window 10 can be properly invoked. An error is presented to the user if the TSR step 86 has not been executed yet.

As shown, query window 10 has an outer border 12 which defines a perimeter for the contents inside the window 10. Window controls 14 are provided which allow the user to control the size and appearance of the window 10 on the computer screen. A help menu 16 is likewise provided giving the user a way into a help system which provides information regarding the use and operation of the present invention. Other similar features may also be provided within the query window 10 as understood by those familiar with windowed interfaces.

Within the query window 10 are found one or more hot-key sequences 18 which correspond to one or more user defined object chains. On the right side of the query window 10 are found corresponding chain descriptions 20 which are entered by the user to describe each of the hot-key sequences 18.

Also shown inside the query window 10 is a highlight bar 22 which designates the last chain hot-key sequence that was invoked by the user. For example, according to the specific embodiment of FIG. 1, "Alt-F2" is a hot-key sequence corresponding to the "Data Archive to All Firewall Repositories" descriptor. The field length of the hot-key sequence 18 and descriptors 20 can vary according to various embodiments of the invention. Vertical and/or horizontal scroll bars may be appropriately implemented.

As understood by those familiar with windowed type interfaces, the contents inside the query window 10 can be modified by adding, deleting or revising hot-key sequences 18 and descriptors 20 using means as described by the present invention. In one embodiment, window 10 is a query window for all user defined object chains so far defined. In such an embodiment, information contained in window 10 is preferably dynamically updated in accordance with user management of chains. In another embodiment, chains may be deleted through the interface at window 10.

Figure 2:
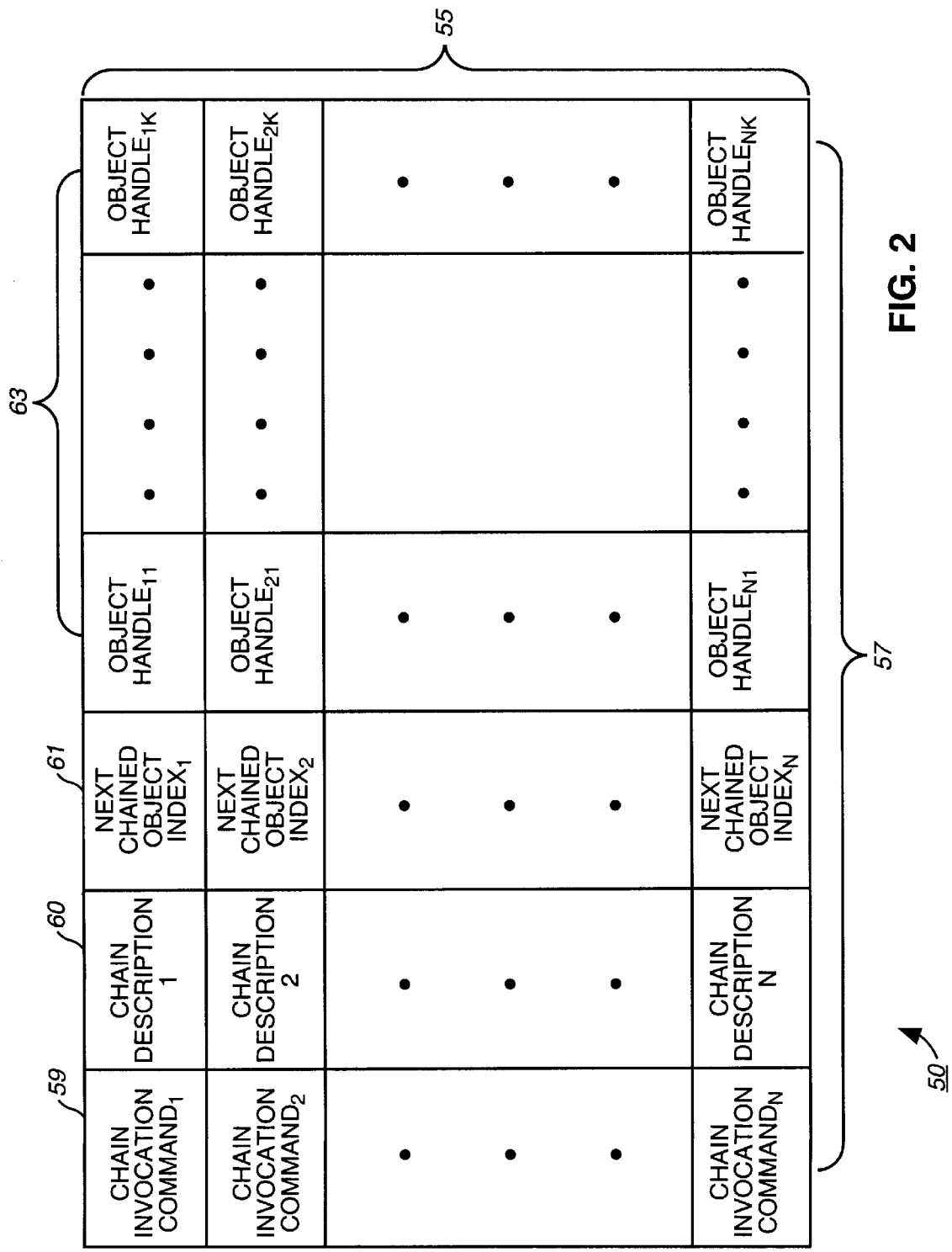
FIG. 2 illustrates a chain table 50 used to store the chain information according to one embodiment of the invention.

Turning now to FIG. 2, a command chain table illustrating the underlying logical data structure for a plurality of stored chains is shown and denoted generally as 50. Chain table 50 consists of N number of rows 55. The number of columns 57 for a chain depends on the particular number of objects of a particular chain. Each one of the rows 55 corresponds to a specific hot-key sequence 18 displayed in the query window 10. Thus, the total number rows 55 corresponds to the number of chain commands displayed in the query window 10.

In one embodiment, each of the rows 55 is preferably a fixed four field record: a chain invocation command, a description, an index, and a pointer to a linked list of object handles. The linked list allows convenient management of a variable number of object handles.

As shown by FIG. 2, each of the rows 55 of the command chain table 50 has a chain invocation command 59 associated with it. The chain invocation command 59 corresponds to the particular hot-key sequence 18 selected and entered by the user. Therewith is an optional chain description field 60.

A handle to the next chained object index 61 comprises the next field in any one of the rows 55 of the table 50. Next chained object index 61 is a designator of the next object in the chain sequence to be focused on since the query window 10 was last recalled. Thus, the user can sequence through one or more hot-key sequences 18 without affecting the execution point within any particular chain. This features permits the mingling of chain invocations for coordination if desired.

As is understood by those familiar with GUIs used in modern windowed operating systems, the use of multiple commands 59 is particularly advantageous where the same application is being used to perform multiple common tasks. Index 61 is used as a pointer to a particular object in a predefined object chain 63. Thus, for any particular chain invocation command 59, the next object index 61 keeps track of the next object to be focused on using an array of object handles 63.

Object handles 63 contain all the information commonly stored and performed on applications in a windowed operating system. The object handles 63 may be 16-bit, 32-bit or other size word handles representing a system reference (pointer) to a multitude of attributes about the particular object it points to. For example, the object handle 63 would reference a system memory location containing many object attributes, for example, the object size and dimensions the object consumes on the GUI, the elements of graphics used, such as list windows, scroll bars, buttons, etc., and other attributes about the object.

According to one embodiment of the invention, the object handles 63 are binary object handles associated with a particular GUI format. A binary object handle 63 is temporary and valid only as long as the underlying application, file or other object type is active on the system. The information in the object handle 63 would change as the user terminates and reinvokes objects on his system GUI. Thus, binary object handles 63 are temporary system variables that correlate to active desktop objects, for the life of the object on the system GUI.

According to another embodiment of the invention, the object handles 63 are permanent multifield records that are constructed and saved from the attributes of the objects corresponding to a particular chain invocation command 59. The permanent objects handles 63 are valid throughout time and survive system power ON and OFF cycles as well as object termination and reinvocation. Thus, a user can save the chain table 50 in a file which can be retrieved later. Permanent object handles 63 can also be saved for a particular user or group of users depending on their function within a given organization or their need to perform certain tasks. Other uses of permanent binary handles will become apparent to those of ordinary skill in the art. In one embodiment, a permanent object handle is composed of the object title bar text, object class, and object unique enumeration with respect to being a node in an application GUI tree of interface objects.

Figure 3:
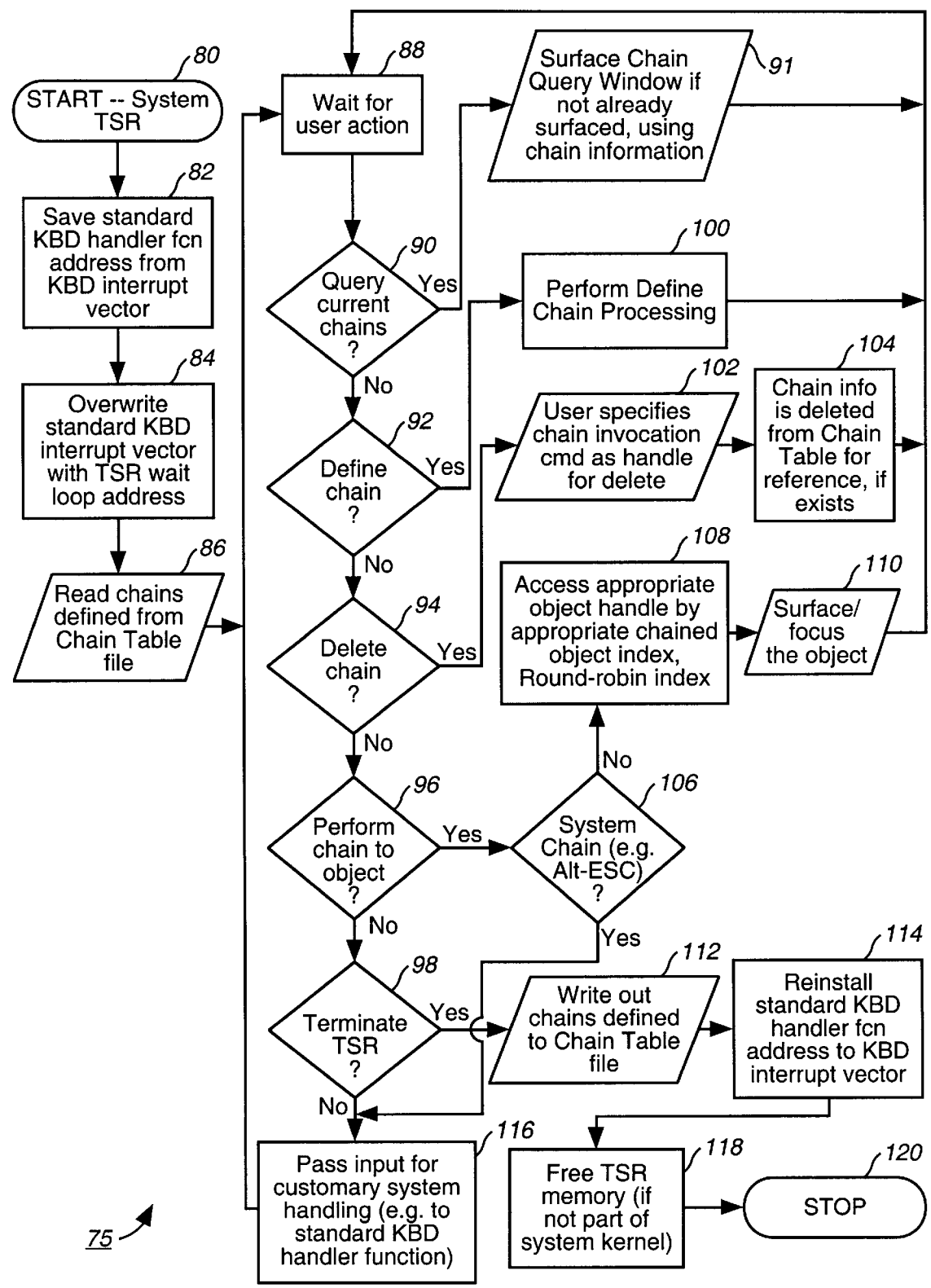
FIG. 3 is a process flow diagram 75 for the method of invoking and setting up chains according to one embodiment of the invention.

Turning now to FIG. 3, a process flow diagram 75 illustrating a method for managing object chains according to one embodiment is shown. Process 75 starts at step 80 wherein the user invokes a software program embodying the invention as herein described. In one embodiment, the application is a Terminate and Stay Resident ("TSR") program that is invoked by a specified reference in a system configuration file (e.g., config.sys or autoexec.bat). Typically, the user is provided with a setup disk that allows him or her to install and configure the TSR program on his computer platform.

Next, process flow is directed to step 82 wherein the standard keyboard handler function address is saved. In step 84, the standard keyboard interrupt vector is overwritten within the TSR wait loop address, (step 88 address) providing a way to service the TSR on an interrupt generated when the user depresses any keyboard keys. It should be understood that steps 82 and 84 are well known to those skilled in the art as standard means of installing TSR programs into computer memory.

In step 86 the program reads predefined chains from a permanent data structure such as the chain table illustrated in FIG. 2. Step 86 is not needed for temporary handle embodiments. Next, process flow is directed to step 88 wherein the program waits for the user to perform some action, for example, the user at this point may want to perform some task by invoking a predefined hot-key sequence 18 that has been entered by the user in a chain table 50. The hot-key sequence 18 corresponds to a specified chain invocation command 59, next chain object index 61 and object handles 63 for a specific sequence of objects appearing on the user's GUI.

Step 88 sees all keyboard activity in the computer system. Steps 90, 92, 94, 96 and 98 determine if keystrokes are meant to operate the present invention. Otherwise, step 116 passes the key stroke(s) to the standard keyboard handler function. Processing returns to step 89 to await further keystrokes.

If, in step 90, it is determined that the user selected to query the available object chains, (e.g. <ctrl><shift><c> simultaneously pressed), then step 95 displays the chain query window 10 if the window is not already on the desktop. If step 90 determines the user did not want to query current chains, then step 90 flows to step 92.

In step 92, if it is determined that the user wants to define a chain (e.g. <cntrl><shift><F1>), then the process flow is directed through a define chain process 100 which is defined by FIG. 4 discussed below. If step 92 determines the user did not want to define a new chain, then step 92 flows to step 94.

If in step 94 it is determined that the user selected to delete a chain (e.g. <cntrl><shift><F2>), then step 102 waits for, and accepts, a specified chain command sequence for deletion, and step 104 deletes the specified chain. This action causes the chain information to be deleted from the chain table 50 if it exists, step 104. If step 94 determines the user did not want to delete a chain, then step 94 flows to step 96.

If in step 96 it is determined that the user selected to focus a particular chain object (e.g. invoke a chain command) then process flow is directed to step 106 wherein the chain invocation command 59 and next chained object index 61 are processed. If the chain command is determined to be the prior art system chain command (e.g. ALT-TAB) then step 116 processes the keystroke in the customary manner. Otherwise, the corresponding object handle 63 is accessed for the particular command 59, step 108, and focuses on the next object within the chain, step 110. Step 108 also increments the index 61 in a round-robin manner so the next object in the index will be focused. If step 96 determines the user did not want to invoke a chain command, then step 96 flows to step 98.

The user may also decide to terminate the TSR (e.g. <cntrl><shift><t>), as determined by step 98, wherein process flow is directed to step 112 causing the program to save all chains defined to a permanent (e.g. file) chain table 50. Step 112 is not needed for temporary handle embodiments. Therefore in step 114 the system's standard keyboard handler is reinstalled to the keyboard interrupt vector for use by the system. Then, step 118 frees up TSR memory and the TSR terminates at step 120.

Where none of the available user actions or hot-key sequences 18 according to this embodiment of the invention have been selected by the user, process flow is directed to step 116 wherein a pass through is performed allowing the user keystrokes to be processed in the usual fashion.

While the embodiment as described by FIG. 3 allows creating and deleting chains, an alternative embodiment is easily defined for additionally being able to add and delete objects to a particular chain. Decision blocks for determining the user selection can be incorporated. An add (e.g., <cntrl><shift><F3>) and delete (e.g., <cntrl><shift><F4>) would pertain to the last focused object of the last invoked chain. Delete object would delete the last invoked object from the last invoked chain. If no objects remain in the chain then the chain would be deleted. Add object would wait for a user selected object (see step 165 below) and would add the object to the chain in the position after the last invoked object of the last invoked chain.

Figure 4:
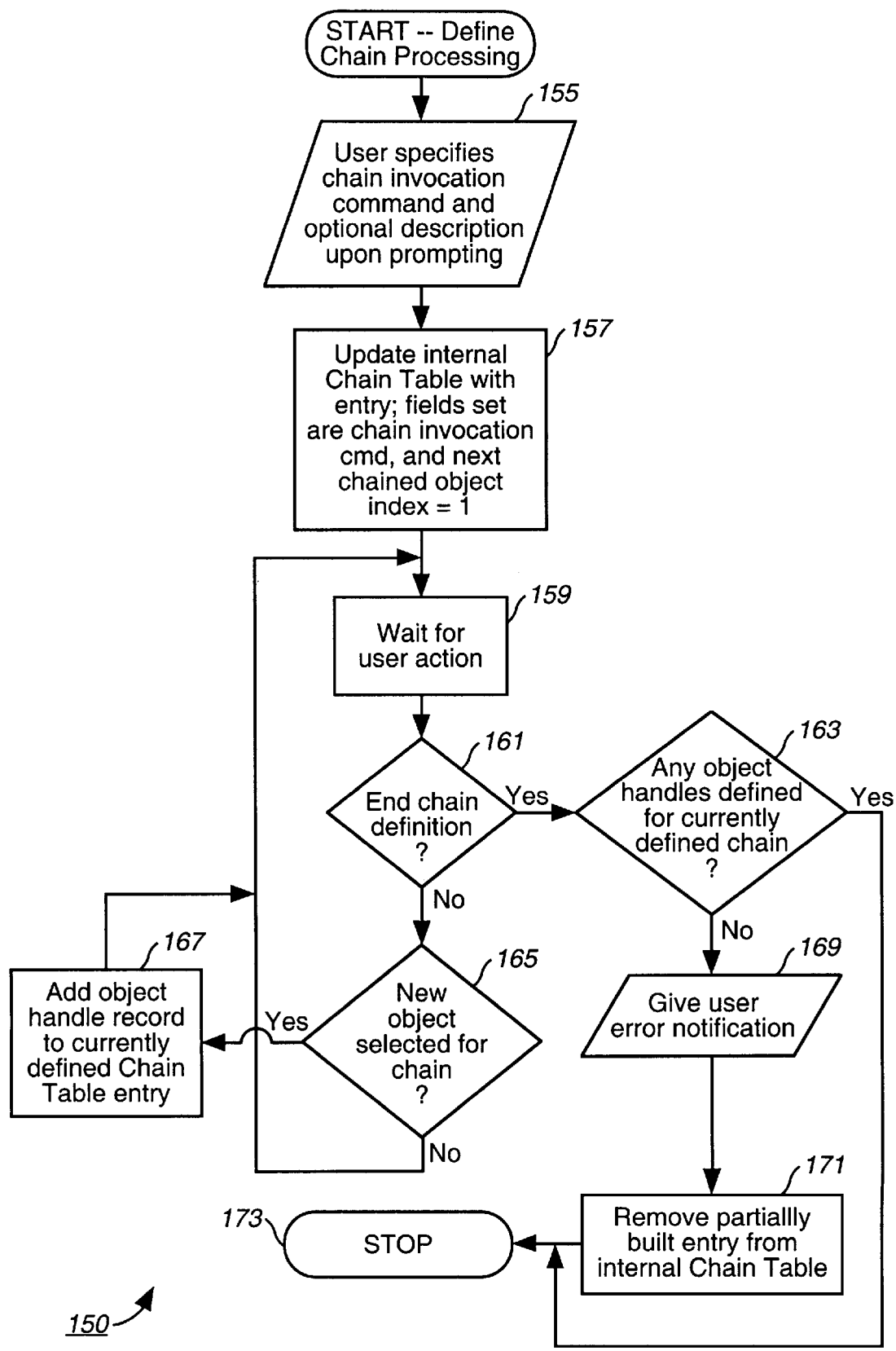
FIG. 4 is a process flow diagram 150 for the chain definition process according to one embodiment of the invention.

Turning now to FIG. 4, the process for defining chains according to one embodiment of the invention is shown and denoted generally as 150. FIG. 4 describes step 100. In particular, the chain definition process 150 begins with step 155 wherein a user specifies a chain invocation command 59 and enters an optional description 60 into a prompt window, step 155. Next, in step 157, the user's chain table 50 is updated with the information entered by the user (a new row 55). The next chain object index 61 is set to 1 for this new chain.

At this point, the system waits for user action, step 159. At some point, the user will complete the chain definition, as determined at step 161 and if the end of the chain has been specified, then the process flows to step 163 wherein the chain is checked to assure objects are defined for the chain.

Alternatively, process flow can be directed to step 165 where it is determined if the user specified an object for the chain being currently defined (e.g. a mark command <cntrl><shift><m> on a focused object). If a focused object was marked, then it is added to the chain, step 167, and entered in the chain table 50 as herein described. Steps 159, 161, 165 and 167 continue until-the user has completed the current object chain and all object handles 63 have been stored in the chain table 50. As is well known to those skilled in the art, there are application programming interfaces to the applicable operating system (OS/2, Microsoft Windows, etc.) for determining the handle of the currently focused object and all information associated with the object via the handle.

Referring back to step 163, if a user fails to define an object for a particular chain command 59, an error message is given to the user, step 169, and the partially built row 55 for that chain is removed from the table, step 171. At this point, the process 150 is terminated, step 173. If step 163 determined one or more objects are defined for the chain, then processing terminates at step 173.

Figure 5:
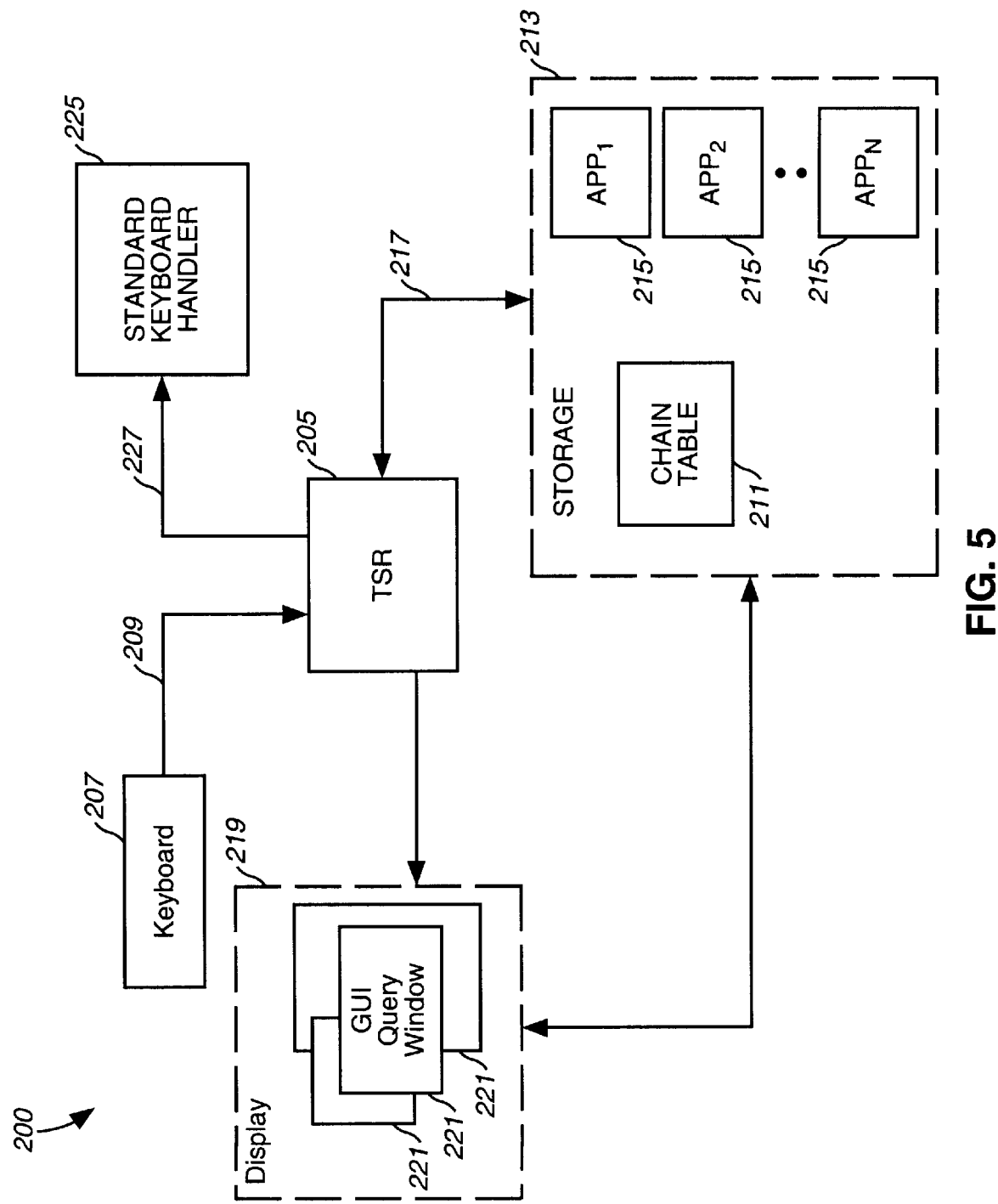
FIG. 5 is a block diagram of a system 200 for managing desktop objects according to one embodiment of the invention.

FIG. 5 is a block diagram, denoted generally as 200, of an apparatus for managing a plurality of objects according to one embodiment of the invention. When installed a Terminate and Stay Resident ("TSR") program 205 receives input 209 from an input device 207, such as a keyboard or other similar input means. The input 209 is processed by the TSR 205 in order to determine if it corresponds to one of the previously defined chain invocation commands 59.

The predefined chain table 211 is maintained in random access memory card and a storage device 213 such as a magnetic tape drive, hard disk, floppy drive or other similar storage means. In a temporary handle environment, the chain table 211 is maintained in only random access memory. Where a predefined chain invocation command 59 for focusing an object is present in the input 209, the TSR program 205 refers to the chain table 211 to determine which application to focus depending on the corresponding next chain object index 61 and object handles 63 (other commands of the present invention also processed by TSR 205). The interaction between the TSR program 205 and chain table 211 is supported by pathway 217.

Also shown is display 219 which gives the user a screen view of the various active application objects 221. The active applications 221 may overlap the available screen area of the display 219. For a given task, the user will want to focus on one application 221 at a time. Thus, the user will depress a particular keystroke sequence which, in turn, will be intercepted by the TSR program 205. The TSR program 205 will read the contents of the chain table 211 and focus an object of a specific application 215 on the display 219.

Thereafter, the user can perform an operation using the focused application object 221 such as a cut, copy or other typical operation supported by the application 215. When finished, the user can continue through the sequence by depressing the corresponding keystroke sequence using keyboard 207. For keyboard input 209 not corresponding to any chain invocation command 59, traffic flow is directed to the standard keyboard handler 225 via pathway 227 and processed in the usual way.

While this invention has been described in reference to illustrative embodiments, this description is not intended to be construed in a limiting sense. Various modifications and combinations of the illustrative embodiments as well as other embodiments to the invention will be apparent to those persons skilled in the art upon reference to this disclosure. It is therefore intended that the claims encompass any such modifications or embodiments.

What is claimed is:

1. An apparatus for managing objects on a graphical user interface, comprising:
   a memory configured to store instructions and a chain table containing one or more chain links, each chain link associating a user-specified invocation command to one or more object handles and one or more application objects; and
   a processor configured to execute the instructions to receive an invocation command from a user, access the chain table to determine a chain link associated with the invocation command, invoke the one or more application objects in the determined chain link, and provide the one or more application objects to the user according to the associated one or more object handles.

2. The apparatus of claim 1 wherein each chain link further associates a user-specified invocation command with a descriptor.

3. The apparatus of claim 2 wherein the processor is further configured to:
   provide a chain query window relating to the chain table, the chain query window providing the user a list of invocation commands and associated descriptors.

4. The apparatus of claim 3 wherein the processor is further configured to:
   allow the user to at least one of add, delete, and modify the list of invocation commands and associated descriptors.

5. The apparatus of claim 1 wherein at least one of the user-specified invocation commands in the chain table corresponds to a keyboard keystroke.

6. A method for managing a plurality of application objects, comprising:
   receiving an invocation command from a user;
   assigning one or more user-specified application objects to the invocation command; and
   generating a chain table, the chain table containing the invocation command and a pointer to each of the one or more user-specified application objects, the chain table allowing application objects to be invoked in any order.

7. The method of claim 6 wherein the chain table also contains at least one object handle for each of the one or more user-specified application objects, each object handle pointing to attributes of the corresponding user-specified application object.

8. A computer-readable medium having a data structure comprising:
   a command invocation field that stores a command for invoking one or more application objects;
   a next chained object field that stores a pointer to a next application object to be focused; and
   one or more object handle fields that store pointers to attributes of an associated application object.

9. The computer-readable medium of claim 8 wherein the data structure further comprises:
   a description field that stores a description of the one or more application objects invoked by the command in the command invocation field.

* * * * *